United States Patent
Goodson et al.

(10) Patent No.: US 10,419,048 B2
(45) Date of Patent: Sep. 17, 2019

(54) SYSTEM AND METHOD FOR DIRECT-SAMPLE EXTREMELY WIDE BAND TRANSCEIVER

(71) Applicant: University of Washington, Seattle, WA (US)

(72) Inventors: Anthony P. Goodson, Seattle, WA (US); John D. Sahr, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/756,501

(22) PCT Filed: Sep. 2, 2016

(86) PCT No.: PCT/US2016/050261
§ 371 (c)(1),
(2) Date: Feb. 28, 2018

(87) PCT Pub. No.: WO2017/041034
PCT Pub. Date: Mar. 9, 2017

(65) Prior Publication Data
US 2018/0254787 A1    Sep. 6, 2018

Related U.S. Application Data

(60) Provisional application No. 62/213,530, filed on Sep. 2, 2015.

(51) Int. Cl.
*H04B 1/10* (2006.01)
*H04L 23/02* (2006.01)
*H04B 1/12* (2006.01)

(52) U.S. Cl.
CPC ............. *H04B 1/109* (2013.01); *H04B 1/123* (2013.01); *H04L 23/02* (2013.01)

(58) Field of Classification Search
CPC .................. H03M 1/00; H04B 1/109
(Continued)

(56) References Cited

U.S. PATENT DOCUMENTS

| 1,342,885 A | 6/1920 | Armstrong |
|---|---|---|
| 6,151,373 A | 11/2000 | Dodley |

(Continued)

FOREIGN PATENT DOCUMENTS

| CN | 102565791 A | 7/2012 |
|---|---|---|
| JP | 2000-236276 A | 8/2000 |
| JP | 2007-503150 A | 2/2007 |

OTHER PUBLICATIONS

International Search Report and Written Opinion dated Nov. 29, 2016, for International Application No. PCT/US2016/050261, filed Sep. 2, 2016, 7 pages.

(Continued)

*Primary Examiner* — Kevin M Burd
(74) *Attorney, Agent, or Firm* — Christensen O'Connor Johnson Kindness PLLC

(57) ABSTRACT

Systems and methods for direct sample, extremely wideband transceivers are disclosed. An example transceiver includes an antenna, an N bit analog to digital converter a digital signal processor, a digital to analog converter, and an adder. The N bit ADC receives a wideband RF input signal from the antenna, where the input signal includes weak signals and a strong signal, oversamples the input signal and provides a digital sample signal. The digital signal processor generates a digital cancellation signal from the digital sample signal, where the digital cancellation signal is generated using M bits, M greater than N. The DAC provides an analog cancellation signal based on the digital cancellation signal, and the adder provides a residual analog signal from the addition of the input signal and the analog cancellation (Continued)

signal, where the strong signal is at least reduced in the residual analog signal due to the analog cancellation signal.

26 Claims, 8 Drawing Sheets

(58) Field of Classification Search
USPC .......................................................... 375/219
See application file for complete search history.

(56) References Cited

U.S. PATENT DOCUMENTS

| | | | |
|---|---|---|---|
| 6,956,517 B1* | 10/2005 | Baker ................. | H03M 1/0626 341/118 |
| 7,091,894 B2 | 8/2006 | Fudge et al. | |
| 7,253,755 B1 | 8/2007 | Fette | |
| 8,081,946 B2 | 12/2011 | Fudge | |
| 8,687,672 B2 | 4/2014 | Ghassemzadeh et al. | |
| 2002/0122464 A1 | 9/2002 | Dodge | |
| 2005/0202790 A1* | 9/2005 | Matsuura .............. | H03M 3/368 455/118 |
| 2006/0267812 A1* | 11/2006 | Bunin ..................... | H03M 1/06 341/120 |
| 2007/0224934 A1* | 9/2007 | Seo ....................... | H04L 25/242 455/23 |
| 2011/0188617 A1* | 8/2011 | Eklund ................... | H03M 1/08 375/346 |
| 2012/0176966 A1 | 7/2012 | Ling | |
| 2013/0329542 A1 | 12/2013 | Gerakoulis et al. | |
| 2014/0369451 A1 | 12/2014 | Wu et al. | |
| 2015/0118970 A1 | 4/2015 | Thoukydides et al. | |
| 2016/0146944 A1 | 5/2016 | Geren et al. | |
| 2016/0173241 A1 | 6/2016 | Goodson et al. | |

OTHER PUBLICATIONS

Walt Kester: "ADC Noise Figure—An Often Misunderstood and Misinterpreted Specification," Analog Devices, Inc., MT-006 Tutorial, 2009, 9 pages.
Walt Kester: "Aperture Time, Aperture Jitter, Aperture Delay Time—Removing the Confusion," Analog Devices, Inc., MT-007 Tutorial, 2009, 8 pages.
Walt Kester: "Basic DAC Architectures I: String DACs and Thermometer (Fully Decoded) DACs," Analog Devices, Inc., MT-014 Tutorial, 2009, 6 pages.
Walt Kester: "Converting Oscillator Phase Noise to Time Jitter," Analog Devices, Inc., MT-008 Tutorial, 2009, 10 pages.
Walt Kester: "Evaluating High Speed DAC Performance," Analog Devices, Inc., MT-013 Tutorial, 2009, 16 pages.
Walt Kester: "The Good, the Bad, and the Ugly Aspects of ADC Input Noise—Is No Noise Good Noise?" Analog Devices, Inc., MT-004 Tutorial, 2009, 12 pages.
Walt Kester: "The Importance of Data Converter Static Specifications—Don't Lose Sight of the Basics!" Analog Devices, Inc., MT-010 Tutorial, 2009, 9 pages.
Walt Kester: "Intermodulation Distortion Considerations for ADCs," Analog Devices, Inc., MT-012 Tutorial, 2009, 6 pages.
Walt Kester: "What the Nyquist Criterion Means to Your Sampled Data System Design," Analog Devices, Inc., MT-002 Tutorial, 2009, 12 pages.
Walt Kester: "Understand SINAD, ENOB, SNR, THD, THD + N, and SFDR so You Don't Get Lost in the Noise Floor," Analog Devices, Inc., MT-003 Tutorial, 2009, 8 pages.
International Preliminary Report on Patentability with Written Opinion dated Mar. 6, 2018 for International Application No. PCT/US2016/050261, filed Sep. 2, 2016, 6 pages.
Baccarelli et al., "A novel approach to In-Band Interference Mitigation in Ultra Wide Band Radio Systems," 2002 IEEE Conference on Ultra Wideband Systems and Technologies, pp. 297-301.
Blazquez et al., "A Baseband Processor for Pulsed Ultra-Wideband Signals," IEEE 2004 Custom Integrated Circuits Conference, pp. 587-590.
Cheng et al., "Narrow-Band Interference Suppression in Impulse-Radio Ultrawideband Systems," IEEE Transactions on Vehicular Technology, vol. 63, No. 7, Sep. 2014, pp. 3440-3446.
Fischer et al., "An Analog Approach to Suppressing In-Band Narrow-Band Interference in UWB Receivers," IEEE Transactions on Circuits and Systems—I: Regular Papers, vol. 54, No. 5, May 2007, pp. 941-950.
Lee et al., "A Frequency-Domain Approach for All-Digital CMOS Ultra Wideband Receivers," 2003 IEEE, pp. 86-90.
O'Donnell et al., "An Ultra-Wideband Transceiver Architecture for Low Power, Low Rate, Wireless Systems," IEEE Transactions on Vehicular Technology, vol. 54, No. 5, Sep. 2005, pp. 1623-1631.
Silva-Martinez, "New RF-to-Digital Architectures for Broadband Communication Systems," RF-to-Digital Receiver Architectures, Barcelona, May 2012, 40 pages.
Yang et al., "Addressing the Dynamic Range Problem in Cognitive Radios," 2007 IEEE, pp. 5183-5188.
Canadian Examination Report dated Feb. 18, 2019 for Canadian Application No. 2,997,183, filed Sep. 2, 2016, 5 pages.
Translation of Japanese Office Action received Mar. 17, 2019 for Japanese Application No. 2018-511633, filed Sep. 2, 2016, 5 pages.
Extended European Search Report dated Mar. 14, 2019 for European Application No. 16843137.7, filed Sep. 2, 2016, 9 pages.

* cited by examiner

COMPUTER READABLE STORAGE MEDIUM 500

INSTRUCTION SET 505

- OVERSAMPLE AN INPUT SIGNAL TO PROVIDE A DIGITAL SAMPLE SIGNAL, WHEREIN THE INPUT SIGNAL IS A WIDE-BAND RF SIGNAL HAVING WEAK SIGNALS AND A STRONG SIGNAL, AND WHEREIN THE DIGITAL SAMPLE SIGNAL IS BASED ON N-BIT SAMPLING
- GENERATE A DIGITAL CANCELLATION SIGNAL OF THE STRONG SIGNAL BASED ON THE DIGITAL SAMPLE SIGNAL, WHEREIN THE DIGITAL CANCELLATION SIGNAL IS AN M-BIT SIGNAL, M BEING GREATER THAN N
- GENERATE AN ANALOG CANCELLATION SIGNAL BASED ON THE DIGITAL CANCELLATION SIGNAL
- SUM THE INPUT SIGNAL WITH THE ANALOG CANCELLATION SIGNAL TO GENERATE A RESIDUAL SIGNAL, WHEREIN THE RESIDUAL SIGNAL IS AN ANALOG SIGNAL INCLUDING THE WEAK SIGNALS AND AT LEAST A REDUCED STRONG SIGNAL
- SAMPLE THE RESIDUAL SIGNAL TO GENERATE A DIGITAL RESIDUAL SIGNAL, WHEREIN THE DIGITAL RESIDUAL SIGNAL INCLUDES QUANTIZATION NOISE INJECTED BY THE GENERATION OF THE ANALOG CANCELLATION SIGNAL
- ESTIMATE THE QUANTIZATION NOISE BASED ON KNOWLEDGE OF THE STRONG SIGNAL IN THE INPUT SIGNAL
- SUBTRACT THE QUANTIZATION NOISE FROM THE DIGITAL RESIDUAL SIGNAL TO RECOVER THE WEAK SIGNALS IN THE DIGITAL RESIDUAL SIGNAL
- INSERT THE STRONG SIGNAL INTO THE DIGITAL RESIDUAL SIGNAL TO PROVIDE A DIGITAL REPRESENTATION OF THE INPUT SIGNAL

SYSTEM AND METHOD FOR DIRECT-SAMPLE EXTREMELY WIDE BAND TRANSCEIVER

CROSS-REFERENCE TO RELATED APPLICATIONS

This application is a National Stage of International Application No. PCT/US2016/050261, filed Sep. 2, 2016, which claims the benefit of U.S. Provisional Application No. 62/213,530, filed Sep. 2, 2015, the contents of which are incorporated herein by reference.

TECHNICAL FIELD

This disclosure relates generally to radios, and in particular but not exclusively, relates to wide band, high dynamic range direct-sample transceivers.

BACKGROUND INFORMATION

Radios are traditionally based on super-heterodyne architecture. The super-heterodyne architecture, however, is complex and is only amenable to one small band of frequencies at a time, e.g., a spectral window. The complexity is due in part to the addition of mixers and various operational frequencies along with the inclusion of filters to suppress unwanted signals outside the desired spectral window. While conventional radios work well and provide robust communication systems, the ability to use a single radio for wider bands and to reduce the complexity of radios is highly desirable.

The desire for replacement radios that meet the goals of complexity reduction and high bandwidth has led to direct-sampling, wide band radios. The development of the direct-sampling, wide band radios has been predicated on the advances in analog-to-digital converter technology, as well as digital-to-analog converters. These radios, however, suffer when in-band strong signals drown out the weaker signals, which reduces the dynamic range of the radio, and have only operated as desired in controlled environments. Additionally, very high speed analog-to-digital converters have limited precision (8 to 10 bits), which suffices for strong signals, but hinders the detection and sampling of weak signals in the presence of strong signals.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 5 is an example computer readable storage medium for implementing a wide-band, high dynamic range direct-sample transceiver in accordance with an embodiment of the present disclosure.

DETAILED DESCRIPTION

Figure 1:
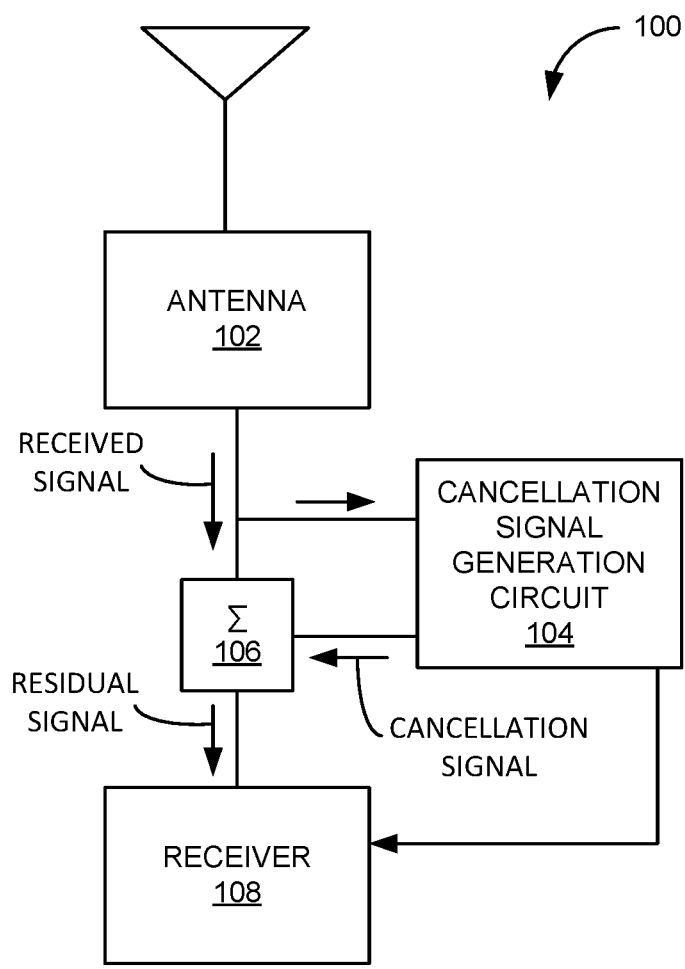
FIG. 1 is a block diagram of an example direct-sample wide band radio in accordance with an embodiment of the disclosure.

Embodiments of a system and method for extremely wide band, high dynamic range direct-sample transceivers are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Direct-sample, extremely-wide-band transceivers may be able to convert all received radio frequency (RF) signals occurring in the extremely-wide-band of frequencies received into digital signals, for example. The RF signals may be directly converted into digital signals without the use of an intermediate frequency and mixers, for example. Additionally, the direct-sample, extremely-wide-band transceiver may not include filters to filter out undesired frequencies, outside of a primary Nyquist filter that admits the entire frequency spectrum of interest. As such, the direct-sample, extremely-wide-band transceiver may provide digital signals across the extremely-wide-band of signals received, which may span any desirable spectral window. For a non-limiting example, the extremely-wide-band may span up to 2 GHz of spectrum. Additionally, the desired spectral window may include AM, FM, GPS, DTV, etc., bands. The direct-sample, extremely-wide-band transceivers, and receivers, may replace multiple conventional super-heterodyne radios due to their ability to detect signals across the extremely wide-band.

The direct-sample, extremely-wide-band transceivers may include an analog-to-digital converter (ADC) to convert the RF signals received into digital signals capable of being analyzed and used by digital signal processors, for example. The RF signals received may include weak signals and strong signals. The ADC, however, may be saturated by the strong signals, which may raise the noise floor above the strength of the weak signals. As a result, the ADC may not be able to sample, e.g., detect, the weak signals. Because any and all signals in the band-width of the transceiver may be desired signals, the loss of the weak signals may severely diminish the usefulness of the direct-sample, extremely-wide-band transceiver.

Stated another way, extremely-wide-band, direct-sample transceivers in uncontrolled environments may be overwhelmed by strong in-band signals, which may prevent the signal processor from detecting weak signals in the wideband. For example, the in-band strong signals, which may occur at any frequency in the range, may saturate an ADC, and/or drive an automatic gain control system in a way that pushes all weaker signal below the noise floor of the ADC. If one or more large signals saturate the ADC, the digital representation of the large signals will be distorted, and all weaker signals will suffer from severe spectral pollution from the nonlinear operation of saturation, effectively increasing the noise floor of the receiver.

A system and method for receiving and transmitting radio frequency (RF) signals with an extremely-wide-band, direct-sample transceiver, in the presence of strong, in-band transmission signals is disclosed herein. The strong, in-band transmission signals may be "own-ship" transmissions or transmissions from nearby or high power transmitters. The transceiver may consist of a preliminary sampling stage, an injection/cancellation stage, a secondary sampling stage, and a digital signal processing system. The preliminary sampling stage samples any and all strong signals with an analog to digital converter, and a cancellation signal may be generated by the digital processing system. The cancellation signal may be a higher resolution signal (more bits), e.g., a better approximation of the strong signal, than the preliminary sampling signal, and may be converted into the analog domain by a digital to analog converter (DAC). Information defining the cancellation signal may also be forwarded to the digital processing system, and the cancellation signal may be combined with the total RF signal in the injection stage, producing a residual signal. The residual signal may have two properties: it may have a low magnitude (e.g., all the strong signals have been removed), and it may be dominated by quantization noise associated with the generation of the cancellation signal. This residual signal may then be sampled by the second sampling stage. The digitized residual signal may be forwarded to the digital processing system.

Since the dominating quantization "noise" was generated from a known signal (e.g., the cancellation signal), this sampling noise may be digitally subtracted from the digital residual signal. The main digital processing system may estimate the cancellation signal quantization noise, and remove it from the digitized residual signal. With the quantization noise thus removed, the original weak signals may be recovered. Both the weak signals and the strong signals captured by the first stage may subsequently be available for further digital processing, and/or retransmission. The receiver may then be characterized as a very high dynamic range, direct digitization receiver.

FIG. 1 is a block diagram of an example direct-sample, wide-band radio 100 in accordance with an embodiment of the present disclosure. The radio 100 may directly sample a wide-band of RF signal and convert the RF signal into a digital signal in the presence of one or more strong in-band signals. The strong in-band signals may be accounted for so that the weaker signals within the RF signal are detectable. In general, the radio 100 may be a wide-bad, high dynamic range capable of detecting weak and strong signals included in the RF input signal without the strong signals adversely affecting the detection of the weak signals.

The illustrated embodiment of the radio 100 includes an antenna 102, a cancellation signal generation circuit 104, a summation circuit 106, and a receiver 108. The cancellation signal generation circuit 104 may be a preliminary sampling stage, the summer 106 an injection/cancellation stage, and the receiver 108 a secondary sampling stage. Additionally, the receiver 108 and the cancellation signal generation circuit 104 may include and/or be coupled to a digital signal processing system. The antenna 102 may receive the wide-band RF input signal and provide an analog signal of the same to the cancellation signal generation circuit 104 and the summer 106. In some embodiments, the antenna 102 may be able to receive an RF signal spanning around 2 GHz of bandwidth. For example, the RF input signal received by the antenna 102 may range from zero hertz up to 2 GHz, and up to 2.5 GHz in other examples. In some embodiments, the range of frequencies included in the input may be dependent upon the sampling rate of the receiver 108, where the higher the sampling rate, the larger the frequency range that may be received. In general, the antenna 102 may receive an extremely wide-band RF input signal in reference to a bandwidth of the weak and/or strong signals contained within the RF input signal, which may have bandwidths ranging from 25 KHz to 6 MHz, for example.

The RF input signal may include a number of weak signals and zero, one, or more strong signals. The strong signals may exceed the strength of the weak signals by 50 dB or more, for example. The zero, one, or more strong signals may be in-band signals occurring at various center frequencies within the bandwidth of the RF input signal, whereas the weak signals may make up the remainder of or larger portions of the bandwidth of the RF input signal. In some embodiments, the bandwidth of the RF input signal may encompass various RF bands of interest, such as AM and FM radio, GPS, digital TV (DTV), etc.

The cancellation signal generation circuit 104 may receive the RF input signal from the antenna 102 and provide an analog cancellation signal to the summer 106 in response. The analog cancellation signal may be a precise approximation of the strong signals in the RF input signal, which may be suppressed or removed from the RF input signal due to the analog cancellation signal. The cancellation signal generation circuit 104 may perform various analog-to-digital and digital-to-analog conversions along with some digital signal processing to generate the analog cancellation signal. For example, the cancellation signal generation circuit 104 may sample the RF input signal to generate a digital sample, e.g., an A-to-D conversion. The digital sample may then be converted into a more precise digital estimation of the strong signals. As used herein, "more precise" may refer to a number of bits used to define the strong signals. Subsequently, the digital estimation of the strong signal may be converted into a digital cancellation signal by inverting a sign of the signal, e.g., converting into a complementary signal. The cancellation signal generation circuit 104 may then convert the digital cancellation circuit to an analog cancellation circuit, e.g., a D-to-A conversion. The digital cancellation signal and/or the digital estimation may additionally be stored and provided to the receiver 108.

The digital sample, which may only include the one or more strong signals, may have been oversampled using a high number of bits to provide a good approximation of the one or more strong signals. For example, the digital sample may have been generated from the RF input signal by sampling at around 5 Giga-samples per second (GSPS), e.g., 5 GHz, using eight bits per sample. The digital sample may then be converted into a more precise digital approximation, e.g., the digital estimation, using more bits than were used to define the digital sample. More precise may mean that the digital approximation may be a higher resolution approximation of the one or more strong signals than the digital sample provides. Improving the precision of the digital sample may be obtained due to oversampling the RF input signal. Further, because the one or more strong signals may be narrow band, especially with regards to the overall bandwidth of the RF input signal, the precision of the estimate may exceed the instantaneous sampling precision due to the oversampling, where the digital sample represents the instantaneous sample of the strong signals. In some embodiments, the conversion of the digital cancellation signal into the analog cancellation signal may include the injection of quantization noise into the analog cancellation signal. The quantization noise, which may appear as white noise having a flat, broad spectrum, may affect the detection of the weak signals by the receiver 108, for example.

In some embodiments, the cancellation signal generation circuit 104 may include an analog-to digital converter (ADC), a digital signal processor, such as an FPGA, and a digital-to-analog converter (DAC). The ADC may sample the RF input signal and provide the digital sample to the digital signal processor, which may convert the digital sample into the digital cancellation signal. In turn, the digital cancellation signal may be converted into the analog cancellation signal by the DAC. Due to the strong signals, the ADC may be saturated and/or an automatic gain may suppress the weak signals below the noise floor of the ADC, which reduces the dynamic range of the ADC, and the radio 100 in turn. The suppression of the weak signals may make them undetectable. As a result, the digital sample may only include noise and the one or more strong signals. In some embodiments, the ADC may be an eight-bit ADC sampling at 5 GHz.

In some embodiments, a digital signal processor included in the cancellation signal generation circuit 104 may generate a more precise estimate of the one or more strong signals due to the oversampling of the RF input signal. Oversampling may provide additional detail regarding the voltage levels of the strong signals, which may allow the digital signal processor to increase the precision and add more bits to digital sample signal, 13 for example. The more precise digital sample may then be converted into the digital cancellation signal. The digital cancellation signal may then be converted into the analog cancellation signal by a DAC. In some embodiments, the DAC may be a 13-bit DAC.

The summation circuit 106 may be coupled to receive the RF input signal from the antenna 102 and the analog cancellation signal from the cancellation signal generation circuit 104 and provide an analog residual signal in response. The one or more strong signals in the RF input signal may be reduced or removed due to the summation with the analog cancellation signal. In some embodiments, the residual signal may also include quantization noise introduced into the analog cancellation signal due to the DAC, for example. In some embodiments, the summer 106 may additionally include a delay element coupled between the antenna 102 and the summation circuit 106, which may delay the RF input signal prior to having the analog cancellation signal added thereto to account for a latency of the cancellation signal generation circuit 104.

The receiver 108 may be coupled to receive the residual signal and convert the same into a digital representation of the RF input signal in response. Additionally, the receiver 108 may be coupled to receive the digital cancellation signal or information about the digital cancellation signal from the cancellation signal generation circuit 104. The receiver 108 may use the digital cancellation signal, or the information about, to recreate the quantization noise injected in the residual signal by the cancellation signal generation circuit 104. The digital cancellation signal may additionally be added back to the residual signal in case the strong signals are signals of interest. Accordingly, the receiver 108 may sample the residual signal, which includes the injected quantization noise, and convert into a digital residual signal. The weak signals, however, may still not be detectable due to the injected quantization noise affecting the dynamic range of a DAC of the receiver 108. Yet, because the receiver 108 has estimated the injected quantization noise from the a priori knowledge of the digital cancellation signal, the injected quantization noise may be subtracted from the digital residual signal, leaving usable weak signals. Additionally, the strong signals may be inserted back into the digital residual signal in case they are signals of interest. As a result, the entire RF input signal may have been fully digitized by the radio 100 even in the presence of the strong in-band signals.

Effectively, due to the oversampling of the strong signals, and the subtraction of the injected quantization noise, the radio 100 is a high dynamic range, wide-band receiver.

While not shown in FIG. 1, the radio 100 may also include various band relevant signal processors coupled to receive the digital representation of the RF input signal in order to demodulate desired signals, such as AM, FM, GPS, DTV, etc. In some embodiments, the radio 100 may include components capable of transmitting signals as well.

In operation, the radio 100 may receive an RF input signal that spans the frequency range of zero to 2 GHz, for example. The RF input signal may include mostly relatively weak signals along with one or more relatively strong signals. The strong signal(s), which may be transmitted by local strong emitters, may be multiple times the strength of the weak signals, for example. If, for example, the radio 100 only included the antenna 102 and the receiver 108, the strong signal(s) may saturate an ADC and/or drive an automatic gain control system of an ADC included in the receiver 108 in a way that pushes all weak signals below the noise floor, rendering all received data across all frequencies of the RF input signal unusable. However, the cancellation signal generation circuit 104 and the summer 106 may provide feedforward cancellation to the radio 100, which may alter the strong signal(s) so that the weak signals become detectable. The strong signal(s) may either be removed from the RF input signal or reduced to a level that allows the weak signals to be detected.

After the strong signal(s) have been removed or reduced, the receiver 108 may sample a residual signal from the summer 106 to provide a digital representation of the entire RF input signal from 0 to 2 GHz after some additional processing. For example, the receiver 108 may reinsert the strong signal(s) in case they are signals of interest and may also remove quantization noise injected into the residual signal. The digital representation of the entire RF input signal may then be available for use by any number of band specific applications, for example, and/or retransmitted.

Figure 2:
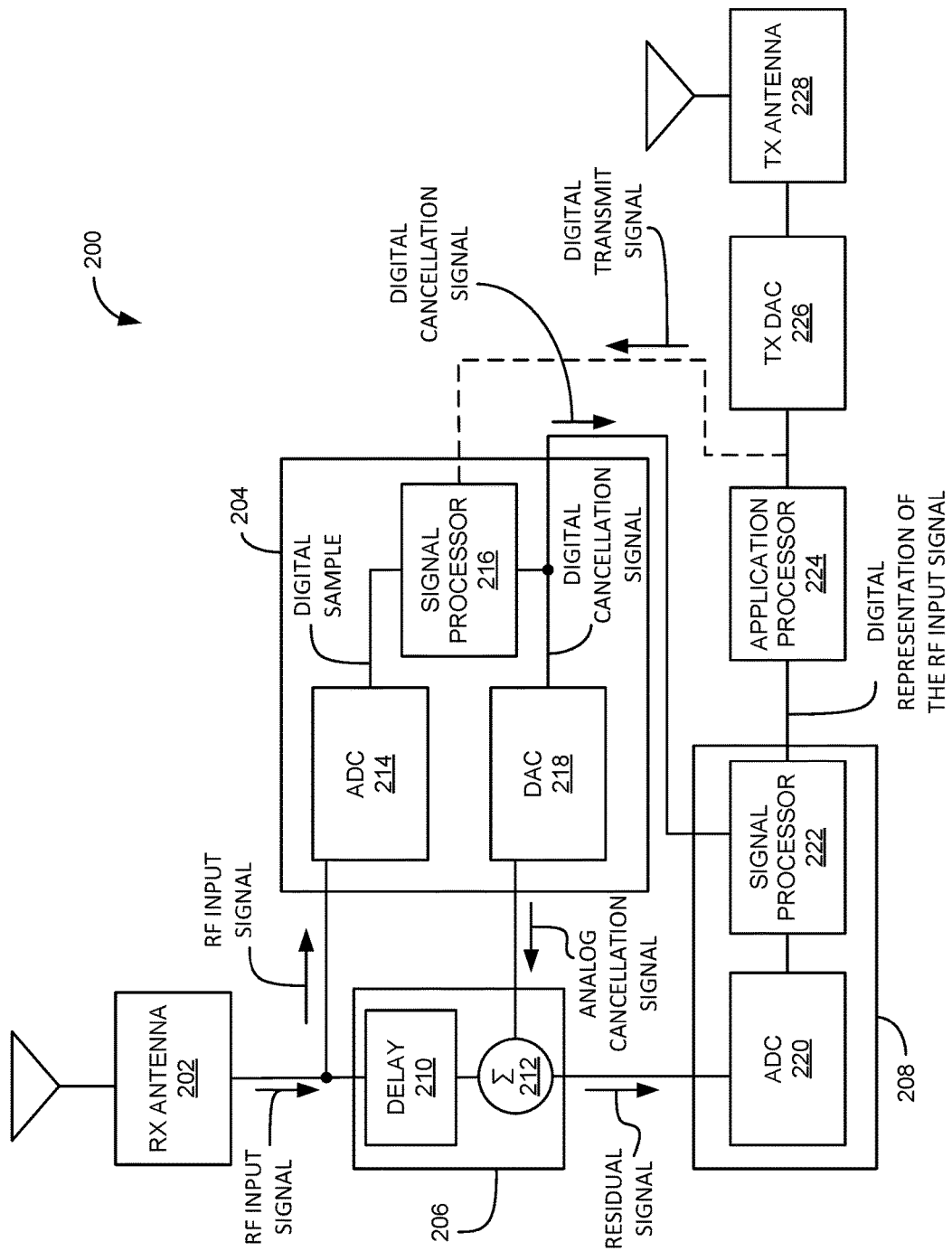
FIG. 2 is a block diagram of an example direct-sample wide band transceiver in accordance with an embodiment of the disclosure.
Figure 3A:
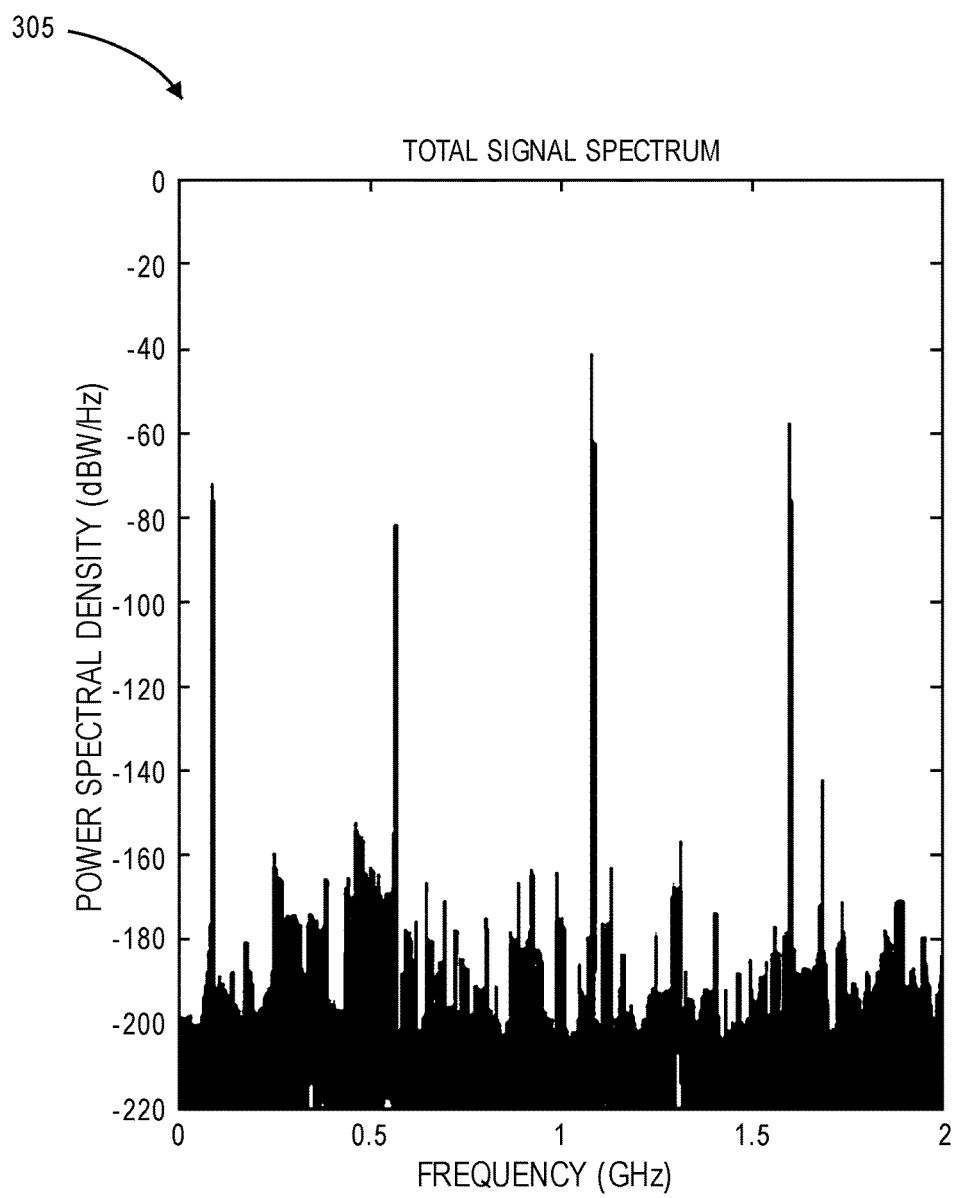
FIG. 3 is a succession of RF plots showing the broadband operation of a transceiver in accordance to an embodiment of the present disclosure.
Figure 3B:
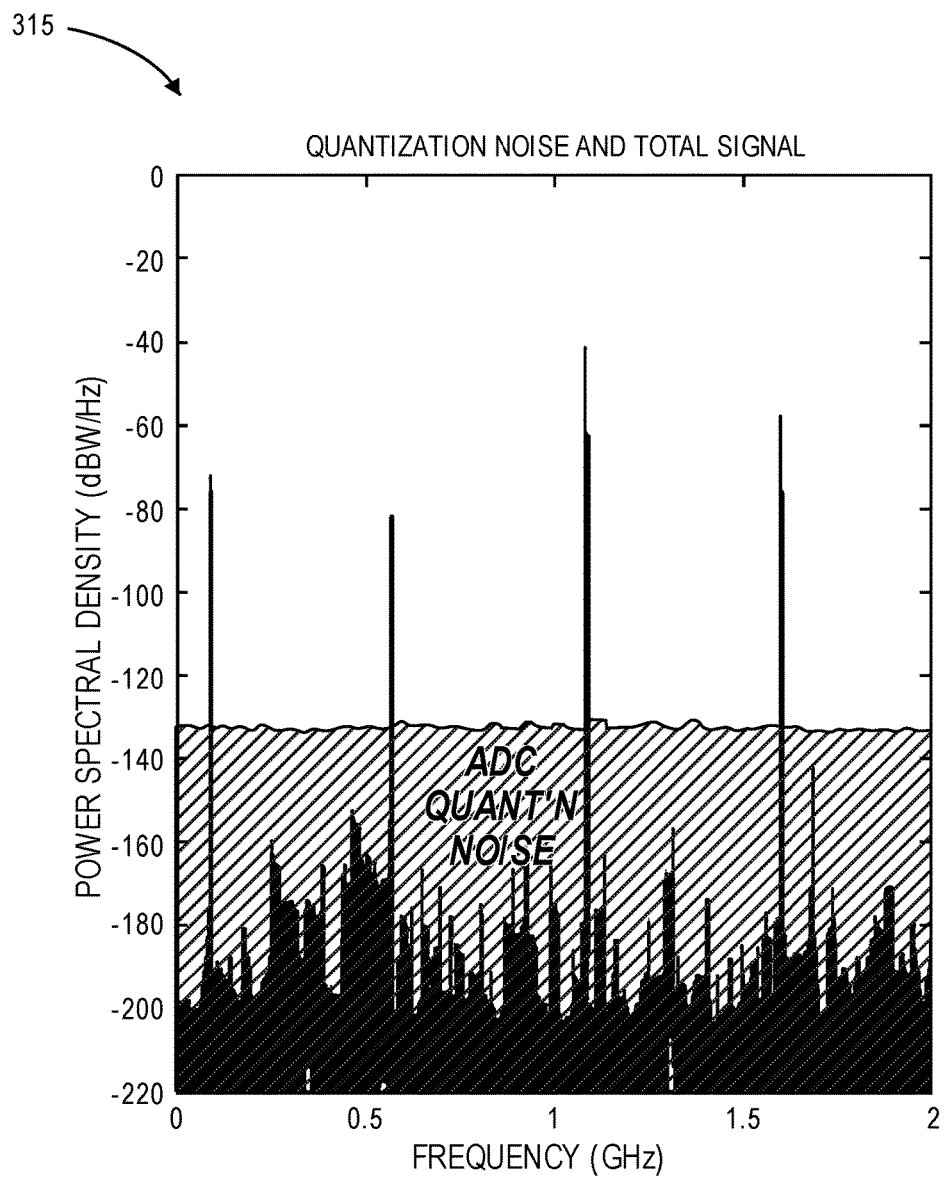
Figure 3C:
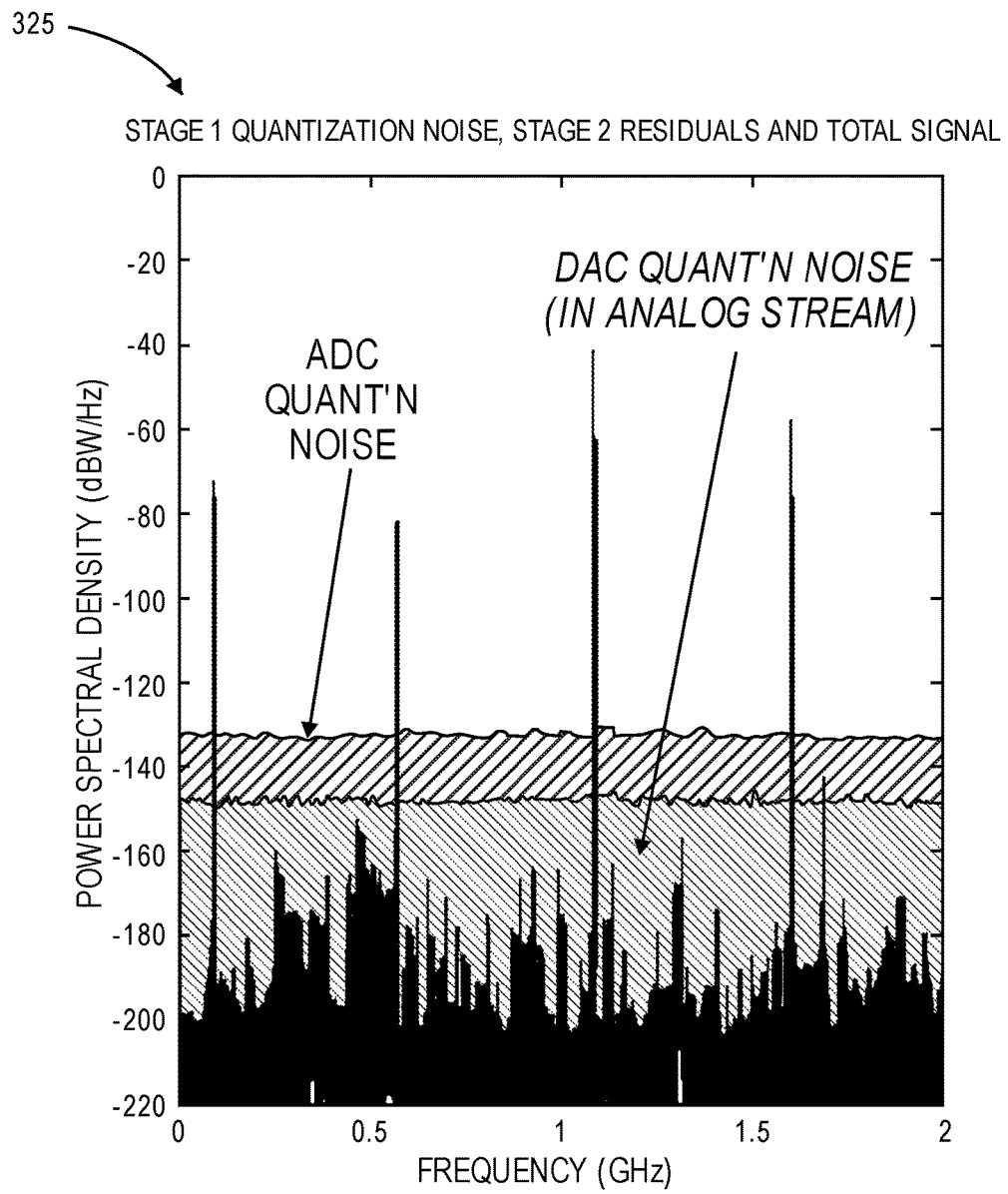
Figure 3D:
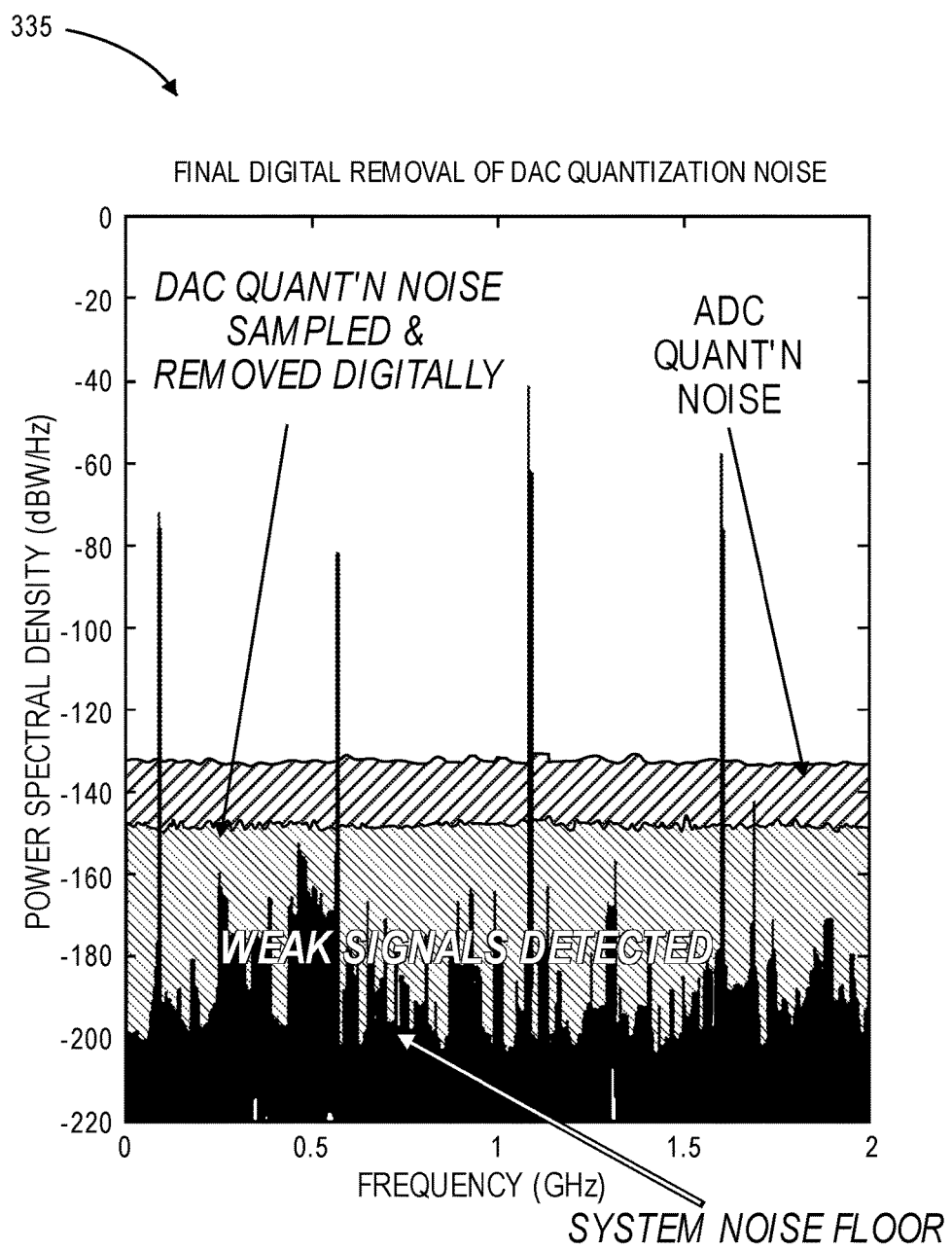

FIG. 2 is a block diagram of a transceiver 200 in accordance with an embodiment of the present disclosure. The transceiver 200 may include an example of the radio 100, plus additional functional components. The transceiver 200 may be a direct-sample, extremely-wide-band radio capable of detecting signals at all frequencies included in the received band-width. In some embodiments, the transceiver 200 may receive up to 2 GHz of band-width, for example, but the band-width is a non-limiting aspect of the present disclosure. The RF signal that covers the received band-width may include weak signals and one or more strong signals. The transceiver 200 may be able to detect the weak signals, even in the presence of the strong signals, and re-transmit the same. In general, the transceiver 200 may be a wide-band, high dynamic range transceiver.

The illustrated embodiment of the transceiver 200 includes a receive antenna 202, a cancellation signal generation circuit 204, a summation circuit 206, a receiver 208, an application processor 224, a transmit DAC 226, and a transmit antenna 228. The receive antenna 202 may receive an RF input signal and provide the same to the cancellation signal generation circuit 204 and the summation circuit 206. Receive antenna 202 may be any type of broadband antenna currently known and developed in the future, and may affect the range of frequencies the transceiver 200 may receive. In some embodiments, the receive antenna 202 may receive up to 2 GHz of frequency. The bandwidth of the receive antenna 202, however, is a non-limiting aspect of the present disclosure and any bandwidth is contemplated.

The cancellation signal generation circuit 204 may receive the RF input signal and provide an analog cancellation signal in response. The analog cancellation signal may be a complement of the strong signals included in the RF input signal, which may be used to remove or reduce the strength of the strong signals in the RF input signal. The illustrated embodiment of the cancellation signal generation circuit 204 includes an ADC 214, a signal processor 216, and a DAC 218. The ADC 214 may sample the RF input signal and provide a digital sample of the strong signals in response. The signal processor 216 may generate a more precise estimation of the strong signals and provide a digital cancellation signal in response. The digital cancellation signal may be a complement of the estimation of the strong signals in order to reduce or remove them from the RF input signals. The DAC 218 may receive the digital cancellation signal and provide an analog cancellation signal in response.

In some embodiments, the ADC 214 may oversample the RF input signal to generate a precise digital sample in response. However, because the strong signals may suppress the weak signals below the noise floor of the ADC 214, the digital sample may only include samples of the strong signals. Oversampling the RF input signal may be performed to increase the precision of the digital sample, which may additionally increase the precision of the digital, and analog, cancellation signal. An amount of oversampling may be based on a ratio of the sampling frequency of the ADC 214 to the bandwidth of the strong signals. The bandwidth of the strong signals may be much less than the sampling frequency of the ADC 214, see FIG. 3 for an example. In some embodiments, the ADC 214 may sample at 5 GHz, and the strong signals may have bandwidths ranging from around 25 KHz to around 6 MHz. Accordingly, oversampling rates may range from 1000 to 100,000. As noted, the oversampling of the strong signals may lead to a more precise approximation of the strong signals by the digital and analog cancellation signals. In some embodiments, the ADC 214 may be at least an 8-bit ADC, which may describe each voltage level along the strong signals using 8-bits.

The signal processor 216 may be a digital signal processor coupled to generate the more precise estimate of the digital sample. For example, the signal processor 216 may convert the digital sample, which may use 8-bits to describe each sampled voltage level, into an estimate of the strong signals using up to 13-bits to describe each sampled voltage level. The 13-bit estimate may be more precise than the digital sample. The added precision may be due to oversampling, which allows the precision of the estimate of a narrow band signal, e.g., the strong signals, to exceed the precision of the digital sample. The oversampling may provide multiple measures of each voltage point along the strong signal, which may be averaged, for example, to provide a finer measure of the actual voltage level. The more accurate sample of the voltage level may allow for a finer estimate of the voltage level of the points along the strong signal due. As such, the finer estimate may allow each point along the strong signal to be defined with greater precision, e.g., more bits, than the points were originally sampled at. This, in turn, allows the use of a higher bit DAC, such as the DAC 218, for converting the digital cancellation signal into an analog cancellation signal. It should be noted that the digital cancellation signal may have an opposite sign, e.g., be the complement of, the estimate of the strong signal so that the analog cancellation signal removes and/or suppresses the strong signals in the RF input signal at the summation circuit 206.

The DAC 218 may be coupled to receive the digital cancellation signal and to generate the analog cancellation signal in response. The DAC 218 may be coupled at an output of the signal processor 216 and coupled at an input of the summation circuit 206. During generation of the analog cancellation signal, the DAC 218 may inject quantization noise, which may have the form of white noise, into the analog cancellation signal. The injected quantization noise may affect subsequent sampling, but because the basis of the injected noise is known, e.g., the digital cancellation signal, the quantization noise may be subtracted after the subsequent sampling. The removal of the injected quantization noise will be discussed in more detail below. As noted, the DAC 218 may be a higher bit component than the ADC 214 due, at least in part, to the estimation performed by the signal processor 216. For example, the DAC 218 may be a 13-bit DAC. In some embodiments, the DAC 218 may be less than 13-bits, such as 9, 10, 11, or 12 bits.

The illustrated embodiment of the summation circuit 206 includes a delay 210 and an adder 212. The delay 210 may be coupled to receive the RF input signal from the antenna 202, delay the same an adjustable amount of time, and provide the delayed RF input signal to the adder 212. The adder 212 may be coupled to receive the delayed RF input signal, and further coupled to receive the analog cancellation signal from the cancellation signal generation circuit 204. The adder 212 may add the two signals, and provide a residual signal as an output. The residual signal may be the RF input signal having the strong signals either suppressed to an acceptable level or removed due to the addition of the analog cancellation signal and the RF input signal.

The delay 210, which may be optional, may be an adjustable delay element configured to introduce some latency into the propagation of the RF input signal. The amount of latency may be based on an amount of latency the cancellation signal generation circuit 204 introduces into transceiver 200. For example, the amount of latency introduced by the delay 210 may account for the amount of time it takes to generate the analog cancellation signal and provide the same to the adder 212. The latency may ensure the analog cancellation signal and the RF input signal are temporally aligned to suppress and/or remove the strong signals from the RF input signal. In some embodiments, however, the delay 210 may not introduce any latency into the RF input signal.

The adder 212 may be a physical connection point where the analog voltages of the RF input signal and the analog cancellation signal are superimposed to generate the residual signal. As such, the connections between the output of the delay 210, the output of the DAC 218, and the input of the receiver 208 may be wires or metal traces with the adder 212 being a node where those wires/traces connect.

The illustrated embodiment of the receiver 208 includes an ADC 220 and a signal processor 222. The ADC 220 may be coupled to receive the residual signal, and sample the residual signal to generate a digital residual signal. In some embodiments, the ADC 220 may have the same bit resolution as the ADC 214. The residual signal may be provided to the signal processor 222. The signal processor 222 may be coupled to receive the digital residual signal and further coupled to receive the digital cancellation signal from the cancellation signal generation circuit 204. In some embodiments, the signal processor 222 may receive information about the digital cancellation signal, such as central frequency, bandwidth, and strength, instead of the signal itself. The information received may be the minimum information required to reconstruct the digital signal provided to DAC 218, for example. The signal processor 222 may add the strong signals back into the digital residual signal and remove the noise injected by the DAC 218 in order to generate a digital representation of the RF input signal including the weak and strong signals.

The ADC 220 may sample the residual signal to provide the digital residual signal. However, due to the injected noise from the DAC 218, the ADC 220 may not be able to detect some or all of the weak signals included in the residual signal. Additionally, if the strong signals are not completely removed from the residual signal, their strength may increase the noise floor of the ADC 220 to further swamp out the weak signals. As such, the output of the ADC 220 may be dominated by the digital sample provided by the ADC 214. However, because the source and basis of the injected noise is known, the signal processor 222 may be able to remove, e.g., subtract out, the injected noise.

The signal processor 222, which may be a digital signal processor similar to the signal processor 216, may be coupled to receive the digital residual signal from the ADC 220 and provide the digital representation of the RF input signal in response. Additionally, the signal processor 222 may be coupled to receive the digital cancellation signal or information about the same from the signal processor 216, for example. Further, the signal processor 222 may reconstruct the quantization noise injected into the analog cancellation signal by the DAC 218, and subsequently remove the same from the digital residual signal.

Because the signal processor 222 receives the digital cancellation signal, it may approximate the analog cancellation signal and the characteristics of the injected noise based on the operating properties of the DAC 218. The approximated injected noise may then be subtracted from the digital residual signal, which may uncover the weak signals. The weak signals may then be provided in the digital representation of the RF input signal. Additionally, because the strong signal may be a signal of interest, the strong signals may be added back to the digital representation of the RF input signal using the digital cancellation signal received from the signal processor 216. It should be noted that the digital cancellation signal may be the same as the strong signals as sampled by the ADC 214 other than a reversed sign.

The application processor 224 may be coupled to receive the digital representation of the RF input signal from the receiver 208 and process various bands of the same. In some embodiments, the application processor 224 may include a plurality of sub-blocks, e.g., sub-processors, tailored to perform receive operations, e.g., demodulation, of various sub-bands within the band-with of the RF input signal. For example, the application processor 224 may have sub-blocks tailored to receive AM radio, FM radio, DTV, and GPS sub-bands. Additionally, the application processor 224 may provide digital information in the various sub-bands for transmission, and/or retransmission of the various sub-bands of the received RF input signal.

Further, the application processor 224 may generate a digital transmission signal. In some embodiments, the digital transmission signal may include a sub-signal form one or more of the sub-blocks. The digital transmission signal may be provided to the signal processor 216, in some embodiments. The digital transmission signal may provide a priori knowledge to the signal processor 216 of the digital transmission signal, which may be used for calibration and/or pre-distortion purposes, for example.

The transmit DAC 226 may be coupled to receive a digital transmit signal from the application processor 224. The DAC 226, which may be similar to the DAC 218, may convert the digital transmit signal into an analog transmit signal and provide the same to the transmit antenna 228. The transmit antenna 228, in turn, may transmit the analog transmit signal.

While the various components of the transceiver 200 are shown as individual components, such a depiction is for ease of discussion. In some embodiments, like or similar components and/or functions may be performed by the same physical component. For example, the ADC 214 and the ADC 220 may be the same physical ADC in an embodiment. Additionally, the receive antenna 202 and the transmit antenna 228 may be the same physical antenna, but time shared for example, in an embodiment. The same may go for the signal processors 216 and 220.

Further, the various components of the transceiver 200 may be software, hardware, or a combination thereof. For example, the signal processors 216 and 220 may be floating point gate arrays (FPGAs), application specific circuits (ASICs), or they may be software and/or firmware installed on a specialized computing system. The ADCs 214, 220, the DACs 218, 226, and the application processor 224 may likewise be formed from FPGAs, ASICs, or software operating on an application specific computer.

The receiver 200 may additionally be able to perform various calibration, timing, and pre-distortion functions to enhance the overall operation. These various functions may be performed internally and/or through receiving the transmit signal as feedback. For example, reference signals may be added to the digital cancellation signal by the signal processor 216, which may be used to self-calibrate at least part of the signal path. The transmitted signal may be analyzed by the receiver 200 to determine transmission distortions and/or to provide antenna characterization and calibration operability.

The signal processor 216 may inject reference signals into the digital cancellation signal. The reference signals may be below the saturation levels of ADC 220, for example, so as not to affect its operation. The reference signals (which may be, for example, pseudo-random number sequences) may be used as timing markers and as a vehicle for characterizing the analog path from the DAC 218 to the ADC 220, for example. The characterization of the analog path may provide the analog path's transfer function, which may be used by the signal processor 222 in recreating the injected noise. The analog path's transfer function may affect the inject noise and having a priori knowledge of the transfer function may allow the signal processor 222 to more accurately recreate the injected noise for enhanced removal of the same from the digital residual signal.

The transceiver 200 may be enabled by the effective high-dynamic range over-sampling of the RF input signal. One issue with the transmitter side of the transceiver 200, however, may be distortion. The distortion may cause the transmitted signal to deviate from the intended signal. However, the transceiver 200 may be able to identify the distortion effects on the transmission through receipt and analysis of the transmitted signal and comparison of the received transmitted signal to the digital transmission signal. For example, the signal processor may compare the digital transmission signal received from the application processor 224 to the received transmission signal via the ADC 214, and determine an amount of distortion in the transmitted signal based on the comparison. Based on the identification and characterization of the distortion, the transceiver 200, by the signal processor 222 and/or the application processor 224, may pre-distort the transmission signal prior to transmission. Pre-distortion may remove or reduce some or all of the dominant distortion effects. As such, if the transceiver 200 includes direct signal generation via the DAC 226 with no tuner, then the analog transmit signal may be "pre-undistorted" using the identified distorting properties of the transmitter, such that the final transmitted signal is distortionless.

Additionally, the transceiver 200 may perform continuous built in test and calibration, which may be directed to the antennae 202 and 228, for example. If each antennae 202, 228 has both a transmit and receive capability, the individual antenna characteristics and the coupling parameters can be continuously estimated. As such, transceiver 200 may provide health and status information on all aspects of the transmitter and receiver operations, as well as evolving estimates of key antenna parameters, such as S11, Snm, etc. The later parameter can evolve as the transceiver 200 is operated in different conditions, such as rain. Further, graceful degradation in the presence of subsystem failure/degradation can be maintained by continuous monitoring of the parameters and adjusting accordingly.

FIG. 3 is a succession of RF plots showing the broadband operation of the transceiver 200 in accordance to an embodiment of the present disclosure. The succession of plots 305-335 will be used to further illustrate an example operation of the transceiver 200. The plots 305-335 depict the change in noise floor throughout the signal path of the transceiver and further illustrate the both wideband and dynamic range capabilities of the transceiver 200.

Each of the plots show the power spectral density over the total spectral range of the RF input signal. The power spectral density is shown in units of dBW/Hz, and the spectral range is given in Hz. The total spectral range is from zero to 2 GHz, and the power spectral density ranges from zero down to −220 dBW/Hz. The RF input signal includes four strong signals spread through the spectral range, with the remaining spectral range including weak signals and background noise. Additionally, plots 315, 325, and 335 include the quantization noise included in the signals post some corresponding process. The quantization noise from the processes is shown in subsequent plots for ease of comparison, but would not be included in the various signals as it would appear in the transceiver 200.

Plot 305 shows the RF input signal as provided by the antenna 202, for example. The plot shows the strong signals, the weak signals, and the background noise. The RF signal as shown in plot 305 may be provided as an input to the ADC 214 and the summer 206.

Plot 315 shows the RF input signal and the quantization noise post sampling by the ADC 214, e.g., ADC QUANT'N NOISE. The quantization noise may be generated by the sampling process, as is known in the art, and is depicted as the light grey broad spectrum signal. Further, the noise floor, e.g., the level of the quantization noise, is above the level of the weak signals, which may cause the weak signals to be undetectable. As discussed above, the weak signals may be suppressed below the level of the noise floor due to the strong signals either saturating the ADC 214 and/or due to automatic gain control system lowing the gain of the ADC 214. In effect, the fixed dynamic range of the ADC 214 may be consumed by the strong signals dominating the RF input signal. As such, if the transceiver 200 were to attempt to use the digital sample as a final signal to provide to the application processor 224, only the strong signals may be usable, rendering a majority of the RF input signal unusable.

Plot 325 shows the RF input signal and the quantization noise injected by the DAC 218 post digital-to-analog conversion by the DAC 218. The quantization noise injected by the DAC 218 is labeled DAC QUANT'N NOISE, and may be present in the analog stream from the DAC 218 to the receiver 208, for example. The lighter grey is the ADC QUANT'N NOISE, which is shown in plot 325 for comparison purposes only and may not be present in the analog stream in the transceiver 200. The DAC QUANT'N NOISE may be lower than the ADC QUANT'N NOISE due to the DAC 218 being based on a higher number of bits, which may generate less quantization noise. However, even though it may be lower, the DAC QUANT'N NOISE may dominate and obscure many of the weak signals in the RF input signal.

Plot 335 shows the RF input signal and the ADC and DAC quantization noise, and the system noise floor after the digital residual signal has been processed by the signal processor 222. The plot 335 may be the digital representation of the RF input signal after the injected quantization noise, e.g., the DAC QUANT'N NOISE, has been subtracted from the digital residual signal. Although the ADC and DAC quantization noises are shown in plot 335, their depiction is for purposes of illustration and would not be in the actual signal provided by the signal processor 222. The system noise floor may be the lower noise of the transceiver 200, but may be low enough so that all, or almost all, weak signals are usable by downstream components, such as the application processor 224. The strong signals included in the plot 335 may also be the original strong signals as sampled by the ADC 214, which may have been added into the digital residual signal by the signal processor 222.

As illustrated by plot 335, the transceiver 200 may be characterized as a high-bandwidth, high dynamic range radio. The high dynamic range shown by the large signal strength difference between the weakest of the weak signals and the strong signals.

Figure 4:
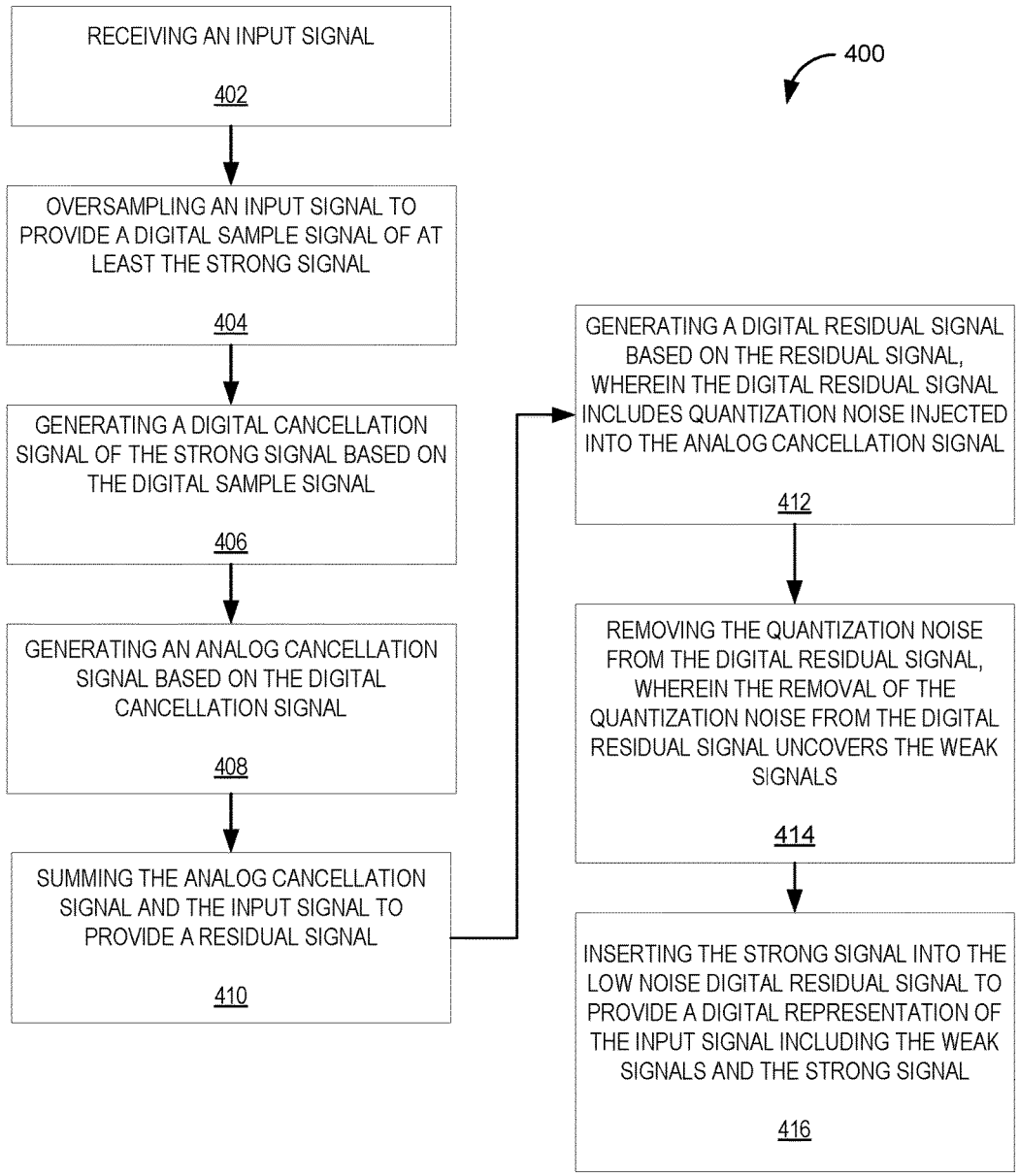
FIG. 4 is an example method of a wide-band, high dynamic range direct-sample transceiver in accordance with an embodiment of the present disclosure.

FIG. 4 is an example method 400 of a wide-band, high dynamic range direct-sample transceiver in accordance with an embodiment of the present disclosure. The method 400 may illustrate an example operation of the transceiver 200.

The method 400 may begin at process block 402, which includes receiving the input signal by a wide-band antenna, such as the antenna 202. The input signal may be an RF input signal that spans at least two gigahertz of frequency, and include weak signals and at least one strong signal. The strong signal is at least 50 dB stronger than the weak signals, for example.

The process block 402 may be followed by the process block 404, which may include oversampling an input signal to provide a digital sample signal of at least the strong signal. The oversampling may be performed by an ADC, such as the ADC 214, which may be an 8-bit ADC sampling at a rate of 5 GHz, for example. The digital sample may only include the strong signal due to the strong signal causing the weak signals to be suppressed below the noise floor of the ADC, which may be due to the relative strength of the strong signal to the weak signals. The relative strength of the signals may affect the dynamic range of the ADC.

The process block 404 may be followed by the process block 406, which includes generating a digital cancellation signal of the strong signal based on the digital sample signal. The digital cancellation signal may be formed by a digital signal processor, such as the signal processor 216. Additionally, the number of bits used to define the digital cancellation signal may be greater than generated by the ADC. For example, the number of bits to define the digital cancellation signal may be 13. Further, the digital cancellation signal may be the complement of the digital sample, e.g., a negative of, so that the strong signal may be removed or reduced when the analog cancellation signal is added to the RF input signal.

The process block 406 may be followed by the process block 408, which includes generating an analog cancellation signal based on the digital cancellation signal. The analog cancellation signal, which may be generated by a DAC, such as the DAC 218, may provide a more precise estimate of the strong signal than the digital sample signal provides. The DAC may be a 13-bit DAC, in some embodiments.

The process block 408 may be followed by the process block 410, which includes summing the analog cancellation signal and the input signal to provide a residual signal. The summation may be performed by the adder 212, for example. The residual signal may include the weak signals and a suppressed strong signal. In some embodiments, the strong signal may be absent in the residual signal.

The process block 410 may be followed by the process block 412, which includes generating a digital residual signal based on the residual signal. The digital residual signal may be formed by an ADC, such as the ADC 220. The residual signal may have quantization noise due to the conversion of the analog cancellation signal, which may be injected into the analog cancellation signal by the DAC 218.

The process block 412 may be followed by the process block 414, which includes removing the quantization noise from the digital residual signal. A digital signal processor, such as the signal processor 222, may estimate the quantization noise based on apriori knowledge of the strong signal, and then remove the quantization noise from the digital residual signal. Accordingly, removal of the quantization noise from the digital residual signal may uncover the weak signals, which may make them usable.

The process block 414 may be followed by the process block 416, which includes inserting the strong signal into the digital residual signal to provide a digital representation of the input signal including the weak signals and the strong signal. The signal processor 222, for example, may insert the strong signal back into the digital residual signal because the strong signal may be a signal of interest.

The order in which some or all of the process blocks appear in the method 400 should not be deemed limiting. Rather, one of ordinary skill in the art having the benefit of the present disclosure will understand that some of the process blocks may be executed in a variety of orders not illustrated, or even in parallel.

FIG. 5 is an example computer readable storage medium 500 for implementing a wide-band, high dynamic range direct-sample transceiver in accordance with an embodiment of the present disclosure. The computer readable storage medium (CRM) 500 may include instruction set 505 to implement the method 400, for example. CRM 500 may be coupled to or incorporated into a computing system or machine and may be performed by the computing system/machine in order to implement an example wide-band, high dynamic range direct-sample transceiver.

The instruction set 505 may include instructions that may cause an executing computing system or machine to oversample an input signal to provide a digital sample signal. The input signal may be a wide-band RF signal having weak signals and a strong signal, and the digital sample signal is based on N-bit sampling. In some embodiments, N may be 8 and the input signal may be sampled at 5 GHz.

The instruction set 505 may further cause the machine to generate a digital cancellation signal of the strong signal based on the digital sample signal, where the digital cancellation signal is an M-bit signal, and M may be greater than N. In some embodiments, M may be 13. Further, the instruction set 505 may cause the computing system or machine to generate an analog cancellation signal based on the digital cancellation signal, and sum the input signal with the analog cancellation signal to generate a residual signal. The residual signal may be an analog signal including the weak signals and at least a reduced strong signal. In some embodiments, the strong signal may be removed from the residual signal.

The instruction set 505 may further cause the computing system or machine to sample the residual signal to generate a digital residual signal, where the digital residual signal includes quantization noise injected by the generation of the analog cancellation signal, and estimate the quantization noise based on knowledge of the strong signal in the input signal. The quantization noise may further be subtracted from the digital residual signal to recover the weak signals in the digital residual signal, and the strong signal may be inserted into the digital residual signal to provide a digital representation of the input signal.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or programmable firmware such as a field programmable gate array ("ASIC"), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A transceiver, comprising:
    a first antenna to receive an input signal, wherein the input signal is an RF signal spanning a wide band of frequencies and including weak signals and a strong signal;
    a first analog to digital converter (ADC) coupled to receive the input signal and provide a digital sample signal in response, wherein the first ADC oversamples the input signal, wherein the digital sample signal at least includes a sample of the strong signal, and wherein the first ADC is a N-bit ADC;
    a first digital signal processor coupled to receive the digital sample signal and provide a digital cancellation signal in response, wherein the digital cancellation signal is a complementary estimation of the digital sample signal, wherein the first digital signal processor generates the digital cancellation signal using M-bits, wherein M is greater than N;
    a first digital-to-analog converter (DAC) coupled to receive the digital cancellation signal and provide an analog cancellation signal in response, wherein the first DAC generates quantization noise when converting the digital cancellation signal into the analog cancellation signal, and wherein the quantization noise is injected into the analog cancellation signal;
    an adder coupled to receive the input signal and the analog cancellation signal and provide a residual analog signal in response, wherein the residual analog signal is a combination of the input signal and the analog cancellation signal, and wherein the strong signal is at least reduced in the residual analog signal due to the analog cancellation signal;
    a second ADC coupled to receive the residual analog signal from the adder and provide a digital residual signal in response through sampling the residual analog signal; and
    a second digital signal processor coupled to receive the digital residual signal and coupled to receive the digital cancellation signal from the first digital signal processor, the second digital signal processor further coupled to provide a digital representation of the input signal including the weak signals and the strong signal in response, wherein the second digital signal processor estimates the quantization noise generated by the first DAC based on the digital cancellation signal received from the first digital signal processor and removes the quantization noise from the digital residual signal by subtracting the estimated quantization noise and reinserts the strong signal to provide the digital representation of the input signal including the weak signals and the strong signal.

2. The transceiver of claim 1, wherein the first ADC is an eight-bit ADC sampling at 5 GHz, and the first DAC is a 10-bit DAC.

3. The transceiver of claim 1, wherein the input signal is 1000 times oversampled.

4. The transceiver of claim 1, wherein an amount of oversampling is based on a ratio of a bandwidth of the input signal to a bandwidth of the strong signal.

5. The transceiver of claim 1, wherein the first digital signal processor determines characteristics of the strong signal based on the digital sample signal that is N-bit, and generates a 13-bit estimation signal in response, and wherein the digital cancellation signal is a complement of the 13-bit estimation signal.

6. The transceiver of claim 1, wherein the removal of the quantization noise makes the weak signals detectable.

7. The transceiver of claim 1, further comprising:
    an application processor coupled to receive the digital representation of the input signal including the weak signals and the strong signal, and demodulate one or more sub-bands of the input signal, and provide a digital transmission signal in response;
    a second DAC coupled to receive the digital transmission signal and provide an analog transmission signal in response; and
    a second antenna coupled to receive the analog transmission signal and transmit the analog transmission signal in response.

8. The transceiver of claim 1, wherein the first antenna is coupled to the first analog to digital converter (ADC), wherein the first digital signal processor is coupled to the first ADC, wherein the first DAC is coupled to the first digital signal processor, and wherein the adder is coupled to the first DAC.

9. The transceiver of claim 8, wherein the second ADC is coupled to the adder, and wherein the second digital signal processor is coupled to the second ADC.

10. The transceiver of claim 1, wherein the first digital signal processor injects one or more reference signals into the digital cancellation signal to, at least in part, calibrate the transceiver.

11. The transceiver of claim 10, wherein the one or more reference signals are below a saturation of the second ADC, and wherein the one or more reference signals include timing markers.

12. The transceiver of claim 11, wherein the one or more reference signals include pseudo-random number sequences.

13. The transceiver of claim 10, wherein the one or more reference signals are utilized to characterize an analog path between the first DAC and the second ADC to determine a transfer function of the analog path, and wherein the estimated quantization noise is determined, at least in part, with the transfer function of the analog path.

14. The transceiver of claim 1, wherein the strong signal includes a plurality of strong signals.

15. A method, comprising:
    sampling, by a first analog-to-digital converter (ADC), an input signal to provide a digital sample signal of a strong signal, wherein the first ADC is an N-bit ADC, and wherein the input signal is an RF input signal spanning a wide band of frequencies and includes weak signals and the strong signal;
    generating, by a first digital processor, a digital cancellation signal of the strong signal based on the digital sample signal, wherein the digital cancellation signal is an M-bit signal, M being greater than N;
    generating, by a first digital to analog converter (DAC), an analog cancellation signal based on the digital cancellation signal, wherein the analog cancellation signal provides a more precise estimate of the strong signal than the digital sample signal provides, and wherein the analog cancellation signal is a complement of the strong signal; and
    summing the analog cancellation signal and the input signal to provide a residual signal, wherein the residual signal includes the weak signals and a suppressed strong signal, and wherein the residual signal is an analog signal;

generating, by a second ADC, a digital residual signal based on the residual signal, wherein the digital residual signal includes quantization noise injected into the analog cancellation signal by the first DAC; and removing, by a second digital signal processor coupled to the second ADC, the quantization noise from the digital residual signal by estimating the quantization noise generated by the first DAC based on the digital cancellation signal received by the second digital signal processor from the first digital signal processor and subtracting the estimated quantization noise to uncover the weak signals.

16. The method of claim 15, further comprising:
receiving the input signal by a wide-band antenna, wherein the input signal spans at least two gigahertz of frequency, and wherein the strong signal is at least 50 dB stronger than the weak signals.

17. The method of claim 15, wherein N is at least 8 and M is at least 10, and wherein the first ADC samples at 5 GHz.

18. The method of claim 15, wherein the first ADC oversamples at a rate based on a ratio of a sampling rate of the first ADC to a bandwidth of the strong signal.

19. The method of claim 15, further comprising:
inserting the strong signal into the digital residual signal to provide a digital representation of the input signal including the weak signals and the strong signal.

20. At least one non-transitory machine-accessible storage medium that provides instructions that, when executed by a machine, will cause the machine to:
sample an input signal to provide a digital sample signal, wherein the input signal is a wide-band RF signal having weak signals and a strong signal, and wherein the digital sample signal is based on N-bit sampling;
generate a digital cancellation signal of the strong signal based on the digital sample signal, wherein the digital cancellation signal is an M-bit signal, M being greater than N;
generate an analog cancellation signal based on the digital cancellation signal;
sum the input signal with the analog cancellation signal to generate a residual signal, wherein the residual signal is an analog signal including the weak signals and at least a reduced strong signal;
sample the residual signal to generate a digital residual signal, wherein the digital residual signal includes quantization noise injected by the generation of the analog cancellation signal;
estimate the quantization noise based on the digital cancellation signal and knowledge of the strong signal in the input signal; and
subtract the quantization noise from the digital residual signal to recover the weak signals in the digital residual signal.

21. The at least one non-transitory machine-accessible storage medium of claim 20, wherein N is at least 8 and M is at least 10, and wherein the input signal is sampled at 5 GHz.

22. The at least one non-transitory machine-accessible storage medium of claim 20, wherein the input signal is oversampled by a factor of at least 1000.

23. The at least one non-transitory machine-accessible storage medium of claim 20, wherein the input signal is at least 2 GHz in bandwidth.

24. The at least one non-transitory machine-accessible storage medium of claim 20, further providing instructions that, when executed by the machine, will cause the machine to perform further operations, comprising:
insert the strong signal into the digital residual signal to provide a digital representation of the input signal.

25. The at least one non-transitory machine-accessible storage medium of claim 24, further providing instructions that, when executed by the machine, will cause the machine to perform further operations, comprising:
demodulate at least one sub-band of the digital representation of the input signal; and
generate a digital transmission signal at a frequency within the wide-band of the input signal.

26. The at least one non-transitory machine-accessible storage medium of claim 25, further providing instructions that, when executed by the machine, will cause the machine to perform further operations, comprising:
convert the digital transmission signal into an analog transmission signal; and
transmit the analog transmission signal.

* * * * *